US010019568B2

(12) United States Patent
Scott et al.

(10) Patent No.: US 10,019,568 B2
(45) Date of Patent: *Jul. 10, 2018

(54) DETECTING GENERATION OF VIRTUAL MACHINE AUTHENTICATION

(71) Applicant: Amazon Technologies, Inc., Seattle, WA (US)

(72) Inventors: Jonathan N. Scott, Snohomish, WA (US); Andrew Richard Butchart, Western Cape (ZA); Gaurang Pankaj Mehta, Seattle, WA (US)

(73) Assignee: Amazon Technologies, Inc., Seattle, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/345,241

(22) Filed: Nov. 7, 2016

(65) Prior Publication Data
US 2017/0083698 A1    Mar. 23, 2017

Related U.S. Application Data

(63) Continuation of application No. 14/495,207, filed on Sep. 24, 2014, now Pat. No. 9,489,510.

(51) Int. Cl.
*G06F 21/45* (2013.01)
*H04L 9/32* (2006.01)
(Continued)

(52) U.S. Cl.
CPC .......... *G06F 21/45* (2013.01); *G06F 9/45533* (2013.01); *G06F 9/45558* (2013.01);
(Continued)

(58) Field of Classification Search
CPC .. G06F 21/45; G06F 9/45558; G06F 9/45533; G06F 2009/45587; H04L 9/3226;
(Continued)

(56) References Cited

U.S. PATENT DOCUMENTS 8,667,281 B1    3/2014 Chenna
8,997,195 B1    3/2015 Fadida
(Continued)

OTHER PUBLICATIONS

"Step 4: Deploy Your App," http://docs.aws.amazon.com/gettingstarted/latest/wah/getting-started-deploy-app-connect.html (date accessed: Sep. 9, 2015).
(Continued)

*Primary Examiner* — Meng Li
(74) *Attorney, Agent, or Firm* — Knobbe, Martens, Olson & Bear, LLP (57) ABSTRACT

Systems and methods for detecting the generation of authentication credentials for virtual machine instances are described. In various embodiments, an intermediary system may detect or determine, for a virtual machine instance, one or more states associated with a credential (e.g., a password) generation process and/or a get password request from a requesting user. Based on detected or determined virtual machine states, the intermediary system may provide useful and/or timely status indicators or notifications to the requesting user. In various embodiments multiple states may be determined sequentially or in parallel in order to provide more detailed information regarding whether and why a credential is or is not available, contributing to an improved user experience. For example, timely indication that a password may not be available may be useful to the requesting user who can take immediate steps to remedy the situation, such as by contacting customer service.

20 Claims, 6 Drawing Sheets

(51) Int. Cl.
*H04L 9/30* (2006.01)
*G06F 9/455* (2018.01)
*H04L 9/08* (2006.01)
*H04L 9/14* (2006.01)

(52) U.S. Cl.
CPC .......... *H04L 9/0825* (2013.01); *H04L 9/0863* (2013.01); *H04L 9/14* (2013.01); *H04L 9/30* (2013.01); *H04L 9/3226* (2013.01); *G06F 2009/45587* (2013.01)

(58) Field of Classification Search
CPC . H04L 9/30; H04L 9/14; H04L 9/0825; H04L 9/0863
See application file for complete search history.

(56) References Cited

U.S. PATENT DOCUMENTS

| | | | |
|---|---|---|---|
| 9,081,963 B1* | 7/2015 | Sima | G06F 21/57 |
| 2003/0005299 A1 | 1/2003 | Xia | |
| 2004/0111644 A1 | 6/2004 | Saunders | |
| 2005/0021781 A1 | 1/2005 | Sunder | |
| 2007/0300221 A1* | 12/2007 | Hartz | G06F 3/1222 |
| | | | 718/1 |
| 2009/0288084 A1 | 11/2009 | Astete | |
| 2010/0024013 A1* | 1/2010 | Cheng | G06F 21/41 |
| | | | 726/5 |
| 2011/0028126 A1 | 2/2011 | Lim | |
| 2013/0007741 A1 | 1/2013 | Britsch | |
| 2013/0080385 A1* | 3/2013 | Ho | G06Q 40/06 |
| | | | 707/613 |
| 2013/0227699 A1* | 8/2013 | Barak | H04L 63/10 |
| | | | 726/26 |
| 2013/0268643 A1* | 10/2013 | Chang | G06F 9/45558 |
| | | | 709/223 |
| 2013/0304511 A1* | 11/2013 | Gunter | G06F 19/322 |
| | | | 705/3 |
| 2014/0082350 A1* | 3/2014 | Zarfoss, III | H04L 63/083 |
| | | | 713/155 |
| 2015/0244710 A1 | 8/2015 | Koster | |
| 2015/0268982 A1* | 9/2015 | Eisenmann | G06F 9/45558 |
| | | | 718/1 |

OTHER PUBLICATIONS

"Amazon EC2 Key Pairs," http://docs.aws.amazon.com/AWSEC2/latest/UserGuide/ec2-key-pairs.html (date accessed: Sep. 9, 2015).
"ec2-get-password," http://docs.aws.amazon.com/AWSEC2/latest/CommandLineReference/ApiReference-cmd-GetPassword.html (date accessed: Sep. 9, 2015).
"GetPasswordData," http://docs.aws.amazon.com/AWSEC2/latest/APIReference/ApiReference-query-GetPasswordData.html (date accessed: Sep. 9, 2015).
"Windows on Amazon EC2 Security Guide," https://aws.amazon.com/articles/Amazon-EC2/1767 (date accessed: Sep. 9, 2015).

* cited by examiner

Retrieve Default OS Administrator Password    Cancel X

405 — To access this instance remotely (e.g., Remote Desktop Connection), you will need your OS Administrator password. A default password was created when the instance was launched and is available encrypted in the system log.

To decrypt your password, you will need your key pair for this instance. Browse to your key pair, or copy & paste the contents of your private key file into the text box below, then click Decrypt Password

Instance: 5e24872e

410 — Encrypted Password:    M59pTZzs8o5|HTaGoyiou

415 — Key Pair:    my-os.pem

*Note: You were prompted to download and save this when you obtained your key pair.*

420 — Private Key*:    <copy and paste your private key here or use the Browse option to upload your private key file>

*Required field    [            ]    Browse...    — 425

Decrypt Password    — 430

DETECTING GENERATION OF VIRTUAL MACHINE AUTHENTICATION

RELATED APPLICATIONS

This application is a continuation of U.S. patent application Ser. No. 14/495,207, filed Sep. 24, 2014 and titled "DETECTING GENERATION OF VIRTUAL MACHINE AUTHENTICATION," the disclosure of which is hereby incorporated by reference herein in its entirety.

BACKGROUND

Companies and organizations operate computer networks that interconnect numerous computing systems to support their operations. The computing systems can be located in a single geographical location (e.g., as part of a local network) or located in multiple distinct geographical locations (e.g., connected via one or more private or public intermediate networks). Data centers may house significant numbers of interconnected computing systems, such as, e.g., private data centers operated by a single organization and public data centers operated by third parties to provide computing resources to customers. Public and private data centers may provide network access, power, hardware resources (e.g., computing and storage), and secure installation facilities for hardware owned by the data center, an organization, or by other customers.

To facilitate increased utilization of data center resources, virtualization technologies may allow a single physical computing machine to host one or more instances of virtual machines that appear and operate as independent computer machines to a connected computer user. With virtualization, the single physical computing device can create, maintain or delete virtual machines in a dynamic manner. In turn, users can request computer resources from a data center and be provided with varying numbers of virtual machine resources on an "as needed" basis or at least on an "as requested" basis.

BRIEF DESCRIPTION OF THE DRAWINGS

Throughout the drawings, reference numbers may be re-used to indicate correspondence between referenced elements. The drawings are provided to illustrate example embodiments described herein and are not intended to limit the scope of the disclosure.

DETAILED DESCRIPTION

Overview

When an instance of a virtual machine resource is created or initialized, in some cases to provide access control and enable a requesting user to securely and privately login to the virtual machine, an authentication credential such as a default administrator password (e.g., for an OS on the virtual machine) must first be generated. However, in some scenarios generation of a default administrator password may be delayed or may never be generated at all, leaving the requesting user wondering why or what went wrong and in some cases unable to securely login to the virtual machine without any explanation.

This disclosure describes embodiments of systems and methods for improving detection of the generation status of authentication credential (e.g., a username, a password such as an administrator password for an operating system ("OS") running on the virtual machine, and/or a virtual machine/computer identifier) for a virtual machine instance, and user notification for virtual machine environments. One aspect of the disclosure involves adding multiple steps and logic around the password generation experience. In some instances, an intermediary system may only be able to determine whether a virtual machine password has been generated. This may confuse a requesting user who, upon submitting a request to "Get Password," may expect that a new password will be generated and provided, either immediately or after a short period of time. However, in some cases a password may not be generated at all, and thus a requesting user may become confused or frustrated if no password is provided after a long delay (e.g., 24 hours). In some existing systems, the requesting user may only have the option to check whether the password has been generated, and if no password has been generated, receive a generic message to wait and try again later.

However, as discussed herein, there may be scenarios in which additional detailed information regarding the status of the authentication credential generation process may be detected by an intermediary system, and provided to the requesting user in order to provide an improved user experience. Thus, for example, an intermediary system configured with improved logic related to the "get password" request and process may determine whether a password will be generated, as well as various associated information regarding the state of the password generation process. For example, the intermediary system may be able to detect whether a virtual machine instance has been created yet for the requesting user, whether the virtual machine instance is running, and other events which may be useful to indicate to the user that a password is not yet available and why. Additionally, the intermediary system may be able to determine within a relatively short time whether a password will not be generated and provide this information to the requesting user, so that the requesting user can take alternative steps to address the situation (e.g., contact a customer service representative, request instantiation of a different virtual machine instance, submit another request for a password, etc.).

In various embodiments, the intermediary system 100 may detect or determine, for a virtual machine instance, one or more states associated with a password generation process and/or get password request from a requesting user. Based on a detected or determined state the intermediary system 100 may provide associated status indicators or notifications to the requesting user. In various embodiments multiple states may be determined sequentially or in parallel in order to provide more detailed information regarding whether and why a password is available or not. For example, in one embodiment, the intermediary system 100 may determine whether the virtual machine instance is running and, if not, provide an associated message to the requesting user that a password is not available yet because the VM instance is not running.

In some embodiments, the intermediary system may utilize a key pair methodology to providing secure and encrypted passwords for users. For example, when a user requests a virtual machine she may create a key pair that is then to be used during the password generation process. A key pair may comprise a public key that is provided to and stored by the intermediary system; and a private key that is stored only to the user. The intermediary system can use the public key to randomly generate and encrypt a password for a virtual machine instance for the requesting user. Once the encrypted password has been generated, the user may then use the private key to securely decrypt the password and/or other login information (e.g., a virtual machine/computer name, network location, and/or other identifier; a username; etc.). Thus, in some embodiments utilizing a key pair methodology as part of the password generation process, the intermediary system 100 may initially determine whether a key pair has been provided or associated with the virtual machine instance and, if not, provide an associated message to the requesting user that a password is not available and cannot be generated due to the missing key pair. The user can then take an appropriate action (e.g., create a key pair and provide the public key for encrypted password generation).

In another embodiment, the intermediary system 100 may determine, for a running virtual machine instance, whether a password is available and, if so, provide an associated message to the requesting user that a password is available, along with various options to enable the user to decrypt the password if it is encrypted (e.g., using the private key corresponding to the public key provided with the get password request).

In another embodiment, the intermediary system 100 may determine whether a running virtual machine instance is ready, and, if not, provide an associated message to the requesting user that a password is not available because the virtual machine instance is not ready. Such a message may further indicate or suggest that the requesting user may check again after a suitable period of time (e.g., 10-15 minutes) during which the virtual machine instance may finish the launch process and change to a ready state.

If the intermediary system 100 determines that a running virtual machine instance is ready and that no password is available, then the intermediary system 100 may logically determine that a password will never be available because, for example, the password generation process is typically completed before the virtual machine instance is made ready. Thus, if the virtual machine instance is ready, the password generation process has likely completed and will not be performed again, and so the intermediary system may determine, based on whether a password exists at this point, whether a password will exist at all. Once the virtual machine instance is ready it may idle until the user securely logs in to begin using the virtual machine. If no password has been generated at this point, the requesting user may never be able to login to the virtual machine. Thus, timely notification of this information may be extremely useful to the requesting user who, knowing that the virtual machine is ready but that logging in will not be possible, can take immediate steps to remedy the situation, such as by contacting customer service.

Various aspects of the disclosure will now be described with regard to certain examples and embodiments, which are intended to illustrate but not to limit the disclosure. Nothing in this disclosure is intended to imply that any particular feature or characteristic of the disclosed embodiments is essential to each embodiment.

Examples of Methods Performed by Intermediary Systems

Figure 1:
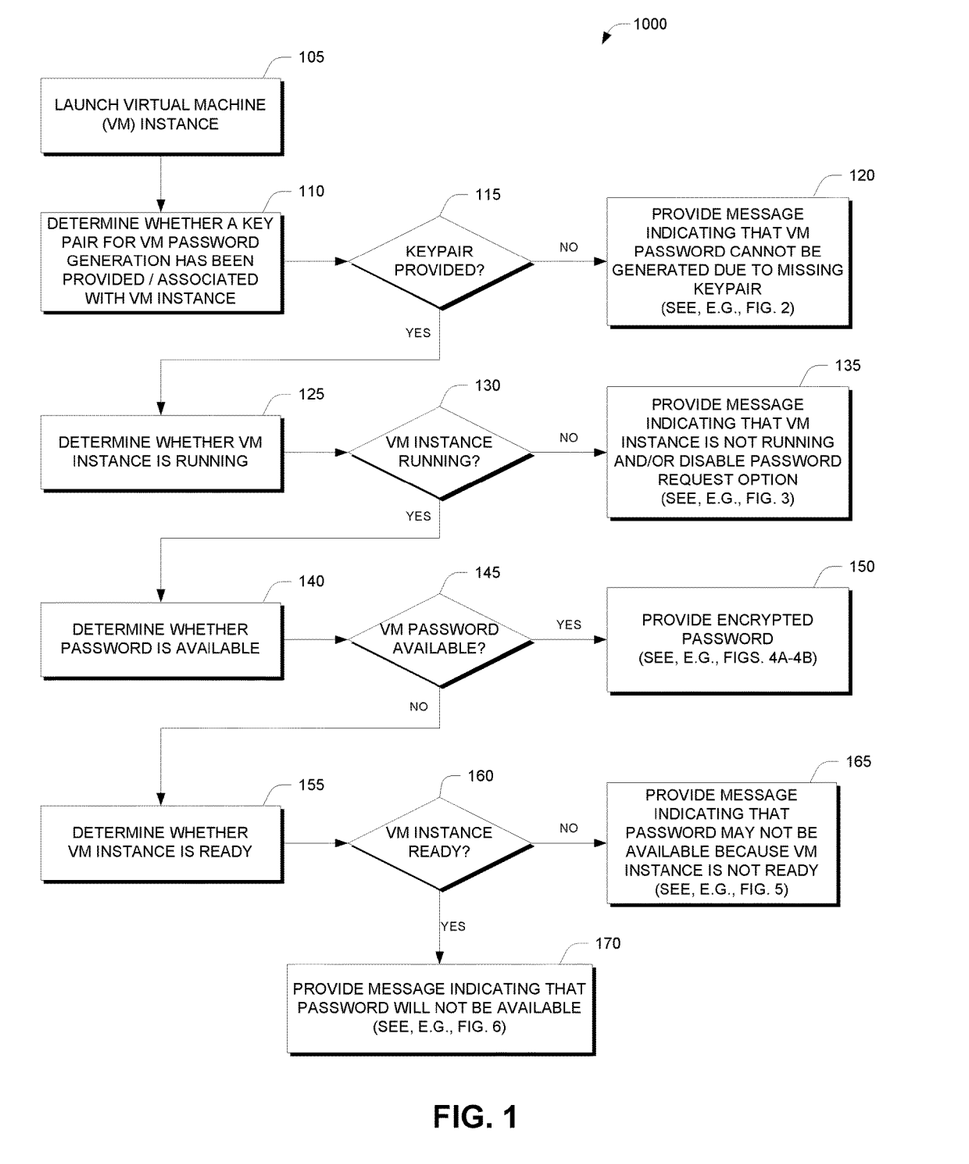
FIG. 1 schematically illustrates a logical flow diagram of an embodiment of a process for determining various virtual machine instance password states and providing associated message indicators to users involving an intermediary system, such as the intermediary system of FIG. 7.

FIG. 1 is logical flow diagram for an embodiment of a process 1000 for determining various virtual machine instance password states and providing associated message indicators to users. In some implementations, the routine is performed by embodiments of the intermediary system 100, described with reference to FIG. 7 or by one of its components, such as an authentication credential manager 730. For example, the intermediary system 100 (or components) can include one or more modules stored in a non-transitory memory, and the one or more modules can be programmed to perform embodiments of the process 1000. For ease of explanation, the following describes the services as performed by the intermediary system 100. The example scenarios are intended to illustrate, but not to limit, various aspects of the intermediary system. In one embodiment, the routine can be dynamic, with some procedures omitted and others added. In one example, multiple instances of the routine may occur concurrently, for different virtual machines and/or services.

At block 105, the intermediary system 100 may launch or begin initiation of a virtual machine ("VM") instance on behalf of a requesting user. For example, with reference to FIG. 7 a user may request via the authentication credential manager 730 that the intermediary system 100 provide one or more computing nodes for execution of a program (or programs) on behalf of the user (or other users authorized by the user).

At block 110, the intermediary system 100 may initially determine whether a key pair to be used to generate a password for the VM instance has been provided or otherwise associated with the VM instance. For example, a public key associated with a key pair may be submitted by a requesting user along with a request to get or generate a password for the VM instance. The public key may be stored and/or accessed from one of the storage nodes 734 included in the intermediary system 100. To determine whether a key pair (or at least a public key) has been associated with the VM instance, the intermediary system may access such information from the storage nodes.

At block 115, the intermediary system 100 determines whether the key pair or public key has been provided or associated with the VM instance. If no key pair or public key has been provided or associated with the VM instance, the process 1000 proceeds to block 720.

At block 720, the intermediary system 100 provides a message for the requesting user indicating that a password for the VM instance cannot be generated because a key pair or a public key has not been provided. One example of a format in which the message may be provided is illustrated and described herein with reference to example user interface 200 in FIG. 2.

Referring again to block 115, if the intermediary system 100 determines that a key pair or public key has been provided or associated with the VM instance, the process 1000 proceeds to block 125.

In some embodiments, generation of an encrypted password using a key pair may not be necessary or required, or the key pair determination may be performed in a separate process. Thus, the process 1000 may optionally skip or omit blocks 110, 115, and 720 and proceed directly to block 125.

At block 125, the intermediary system 100 determines whether the VM instance is running. The intermediary system 100 may base this determination at least in part on a console log 732 which may be updated, for example, by the VM manager 724 of FIG. 7 when a new VM instance begins running. For example, the console log 732 may include a log entry indicating that the VM instance is running, or other log entries which may be related to and/or generally indicative of a running VM instance. In another embodiment, the intermediary system 100 may receive or otherwise access a message generated by the VM instance itself when the VM instance is running.

At block 130, the intermediary system 100 determines whether the VM instance is running. In response to determining that the VM instance is not running, the process 1000 proceeds to block 135.

At block 135, the intermediary system 100 provides a message for the requesting user indicating that the password is not available yet because the VM instance is still launching, initializing, or otherwise not running yet. The message may also include additional information which may be useful to inform the user of approximate wait times or a suggestion to retry after a period of time (e.g., 10-15 minutes). One example of a format in which the message may be provided at block 135 is illustrated and described herein with reference to example user interface 300 in FIG. 3.

Referring again to block 130, if the intermediary system 100 determines that the VM instance is not running, the process 1000 proceeds to block 140.

At block 140, the intermediary system 100 determines whether a password is available. The intermediary system 100 may base this determination at least in part on the console log 732 which may be updated, for example, by the VM manager 724 when the password has been generated for the VM instance. For example, the console log 732 may include a log entry indicating that the password has been generated (the log entry may or may not include the actual password). In another embodiment, the intermediary system 100 may receive or otherwise access a message generated by the VM instance itself when the password has been generated. In another embodiment, once the password is generated and/or encrypted it may be stored in one of the storage nodes 734 and accessed by the password status manager 7xx. Thus, if no password is found in the storage nodes 734 the intermediary system 100 may determine that no password is available.

At block 145, the intermediary system 100 determines whether the password is available. In response to determining that the password is available, the process 1000 proceeds to block 150.

At block 150, the intermediary system 100 provides a message for the requesting user indicating that the password is available. The message may also include additional information which may be useful to instruct the user in how to, for example, decrypt the password (if it is encrypted). In cases where the user must decrypt the password, the user may be directed through one or more user interfaces to complete the decryption process and securely obtain the generated password. One example of a format in which the message may be provided at block 150 is illustrated and described herein with reference to example user interface 400A in FIG. 4A and example user interface 400B in FIG. 4B.

Referring again to block 145, in response to a determination that the password is not available, the process 1000 proceeds to block 155.

At block 155, the intermediary system 100 determines whether the VM instance is ready. The intermediary system 100 may base this determination at least in part on the console log 732 which may be updated, for example, by the VM manager 724 when the VM instance is ready and/or the VM launch process has completed. For example, the console log 732 may include a log entry indicating that a final step of the launch process has completed, which the intermediary system 100 may interpret to mean that the VM instance is ready. In another embodiment, the log entry may indicate "VM is ready," "OS is ready," or a similar status indicator.

At block 160, the intermediary system 100 determines whether VM instance is not ready. In response to determining that the VM instance is not ready, the process 1000 proceeds to block 165.

At block 165, the intermediary system 100 provides a message for the requesting user indicating that the password may not be available because the VM instance is not ready. One example of a format in which the message may be provided at block 165 is illustrated and described herein with reference to example user interface 500 in FIG. 5.

Referring again to block 160, in response to a determination that the VM instance is ready, the process 1000 proceeds to block 170.

At block 170, the intermediary system 100 provides a message for the requesting user indicating that a password will not be available for the VM, for example because the VM launch process has completed and no password is available. One example of a format in which the message may be provided at block 170 is illustrated and described herein with reference to example user interface 600 in FIG. 6.

Example User Interfaces

FIGS. 2, 3, 4A, 4B, 5, and 6 illustrate sample user interfaces that may be generated by or used with the intermediary system 100, providing message indicators associated with various password states determined by the intermediary system 100, and providing associated various user interface controls to enable functionality as described in this disclosure. In various embodiments, each of the user interfaces shown in FIGS. 2, 3, 4A, 4B, 5, and 6 may be presented as a web page, as a mobile application display, as a stand-alone application display, as a popup window or dialog box, as an email message, or by other communication means. In other embodiments, analogous interfaces may be presented using audio or other forms of communication. In an embodiment, the interfaces shown in FIGS. 2, 3, 4A, 4B, 5, and 6 are configured to be interactive and respond to various user interactions. Such user interactions may include clicks with a mouse, typing with a keyboard, touches and/or gestures on a touch screen, voice commands, and/or the like.

Figure 2:
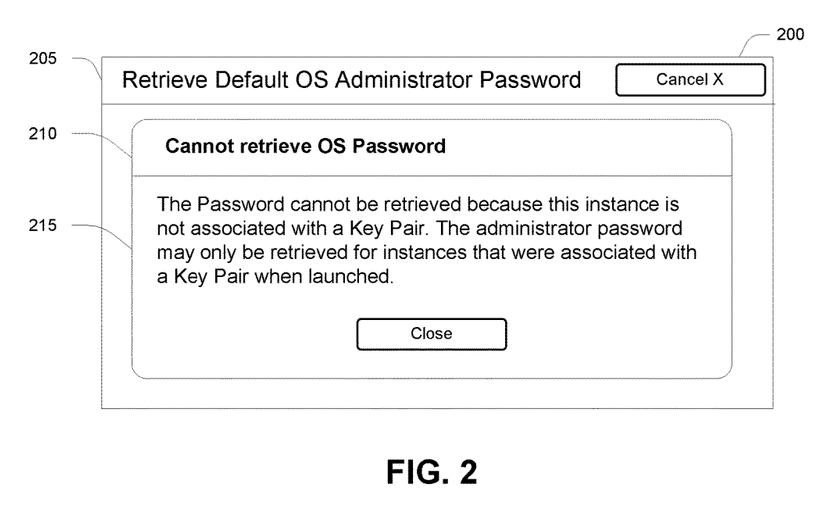
FIGS. 2, 3, 4A, 4B, 5 and 6 are example user interfaces which provide users with various password status message indicators as generated by an intermediary system, such as the intermediary system of FIG. 7.

FIG. 2 illustrates an example user interface 200, in the form of a dialog box, which presents a user with a message indicating that a password for the OS running on the virtual machine instance cannot be retrieved due to a missing Key Pair. The example user interface 200 and/or the associated message may be generated and provided, for example, by the intermediary system of FIG. 7 during the process 1000 (e.g., at block 720) for certain embodiments in which password generation involves or is based at least in part on the use of Key Pair, such as for encryption and/or to provide security.

The user interface 200 may include several display and user interactive elements, including display element 205, display element 210, and display element 215. Additional user interaction controls may also be provided such as buttons and other controls usable to, for example, cancel or close the dialog box. At display element 205 the user interface 200 presents a header indicating a title (e.g., "Retrieve Default OS Administrator Password") associated with the provided message. Depending on the message provided the title may comprise different or alternative text or other information. At display element 210 the user interface 200 presents a heading associated with the provided message. As illustrated the heading indicates "Cannot retrieve OS password," and additional explanatory text is provided at display element 215 to explain to the user that the OS password cannot be retrieved because the VM instance is not associated with a Key Pair. The explanatory text further indicates that, for example, an administrator password can only be retrieved for instances that were associated with a Key Pair when launched. In other embodiments, the explanatory text at display element 215 may include alternative text or explanations which may depend on the specific embodiment or use case. In another example, the explanatory text may indicate that the password cannot be generated at all without a Key Pair and provide the user with actionable controls to, for example, provide or upload a Key Pair that can be used to generate the password, or redirect to another user interface where a Key Pair can be provided to the intermediary system.

Figure 3:
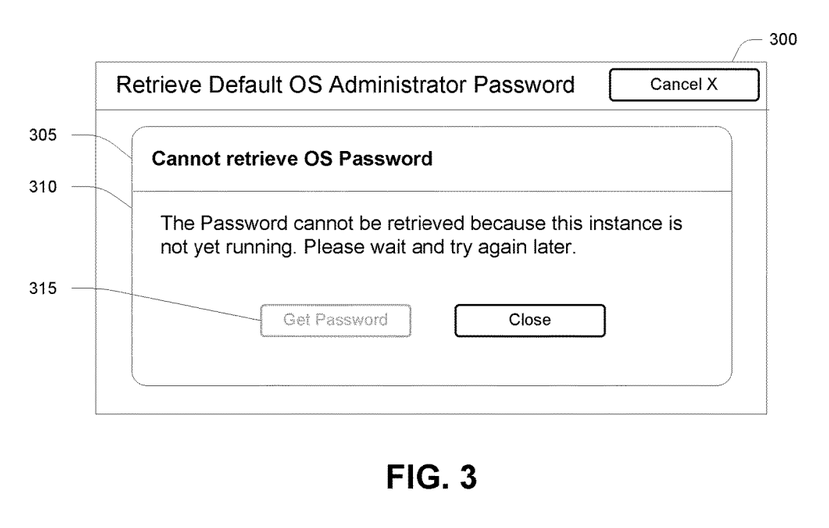

FIG. 3 illustrates an example user interface 300, in the form of a dialog box, which presents a user with a message indicating that a password cannot be retrieved because the VM instance is not yet running. The example user interface 300 and/or the associated message may be generated and provided, for example, by the intermediary system of FIG. 7 during the process 1000 (e.g., at block 135).

The user interface 300 may include several display and user interactive elements, including display element 305, display element 310, and user control element 315. Additional user interaction controls may also be provided such as buttons and other controls usable to, for example, cancel or close the dialog box. At display element 305 the user interface 300 presents a heading associated with the provided message. As illustrated the heading indicates "Cannot retrieve OS password," and additional explanatory text is provided at display element 310 to explain to the user that the OS password cannot be retrieved because the VM instance is not yet running. Display element 310 may present more or less explanatory text, such as a suggestion to the user to try requesting the password again a period of time later. The user interface 300 may also provide, for example via user control element 315, a button or other user-selectable control to enable the user to submit a request to "Get Password." In some embodiments, such as the one as illustrated, the "Get Password" button or control may be disabled in cases where the VM instance is not yet running. The button or control may further be configured to be automatically updated by the intermediary system 100 to an enabled state if the intermediary system 100 determines that the VM instance is running.

Figure 4A:
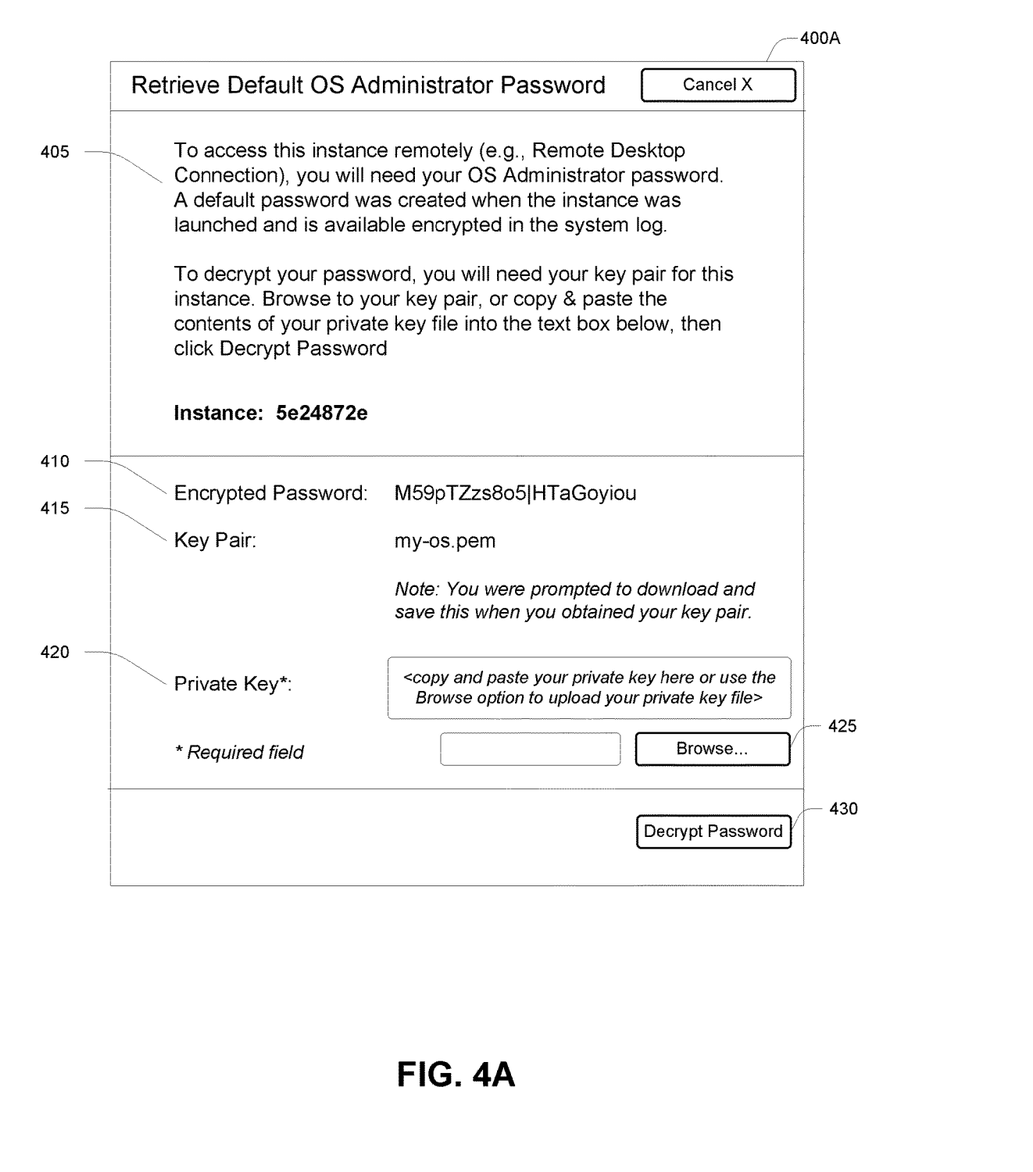

FIG. 4A illustrates an example user interface 400A, in the form of a dialog box, which presents a user with a message indicating that a password is available for the VM instance. The example user interface 400A and/or the associated message may be generated and provided, for example, by the intermediary system of FIG. 7 during the process 1000 (e.g., at block 150).

The user interface 400A may include several display and user interactive elements, including display element 405, display element 410, display element 415, display/user control element 420, user control element 425, and user control element 430. Additional user interaction controls may also be provided such as buttons and other controls usable to, for example, cancel or close the dialog box. At display element 405 the user interface 400A presents a message instructing that a default OS administrator password was generated and will need to be used to access the VM instance remotely (e.g., by using a program such as Remote Desktop Connection or similar).

Figure 4B:
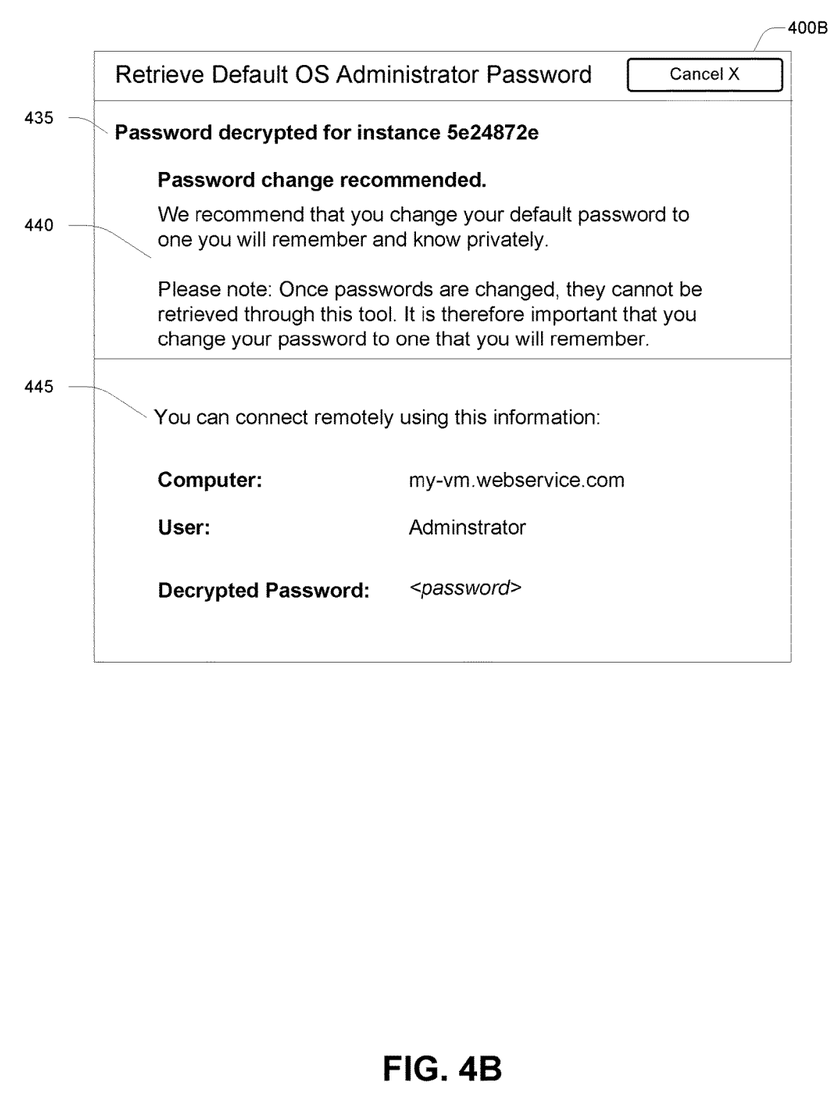

For certain embodiments utilizing a key pair methodology, the message shown at display element 405 may also provide the user with further instructions for how to obtain a decrypted password using the key pair associated with the VM instance. Display element 410 provides the encrypted password and display element 415 provides a name of the key pair used to generate the encrypted password. Display element 415 as shown also includes a brief explanation to remind the user that she was prompted to download and save the key pair when it was first obtained. Display/user control element 420 may be provided in the form of a text box user control which the user can use to copy and paste her private key text. A "Browse" option may also be presented to the user at user control element 425 is to enable the user to launch a file browse dialog and select a local key pair file from her computer to be uploaded to intermediary system 100 to decrypt the password. User control element 430 enables the user to "Decrypt Password," which may trigger the intermediary system 100 to upload the key pair file or read the private key text from the display/user control element 420 in order to decrypt the password. The user may then be redirected to example user interface 400B to obtain the decrypted password.

FIG. 4B illustrates an example user interface 400B, in the form of a dialog box, which presents a user with a message indicating that the password has successfully been decrypted. The example user interface 400B and/or the associated message may be generated and provided, for example, by the intermediary system of FIG. 7, such as in response to the user selecting the "Decrypt Password" option illustrated and described with reference to user interface 400A in FIG. 4A.

The user interface 400B may include several display and user interactive elements, including display element 435, display element 440, and display element 445. Additional user interaction controls may also be provided such as buttons and other controls usable to, for example, cancel or close the dialog box. At display element 435 the user interface 400B presents a message instructing that a default OS administrator password was decrypted for the VM instance. Display element 440 may provide further explanatory text or useful information for the user, including a suggestion to change the password to something the user is likely to remember, and a reminder that once a password has been changed it can no longer be retrieved via the current user interface, tool, and/or process. Finally, display element 445 may present various secure information associated with the decrypted password, including for example: a virtual machine/computer name, network location, and/or other identifier; a username; the decrypted password text; and any other authentication information associated with the VM instance that the user may need.

Figure 5:
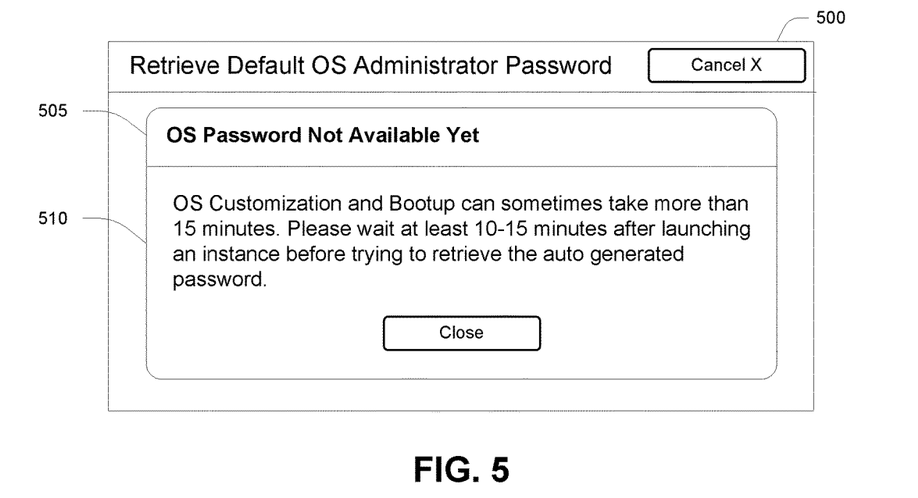

FIG. 5 illustrates an example user interface 500, in the form of a dialog box, which presents a user with a message indicating that a password is not yet available because the VM instance is not ready. The example user interface 500 and/or the associated message may be generated and provided, for example, by the intermediary system of FIG. 7 during the process 1000 (e.g., at block 165).

The user interface 500 may include several display and user interactive elements, including display element 505 and display element 510. Additional user interaction controls may also be provided such as buttons and other controls usable to, for example, cancel or close the dialog box. At display element 505 the user interface 300 presents a heading associated with the provided message. As illustrated the heading indicates "OS password Not Available Yet," and additional explanatory text is provided at display element 510 to explain to the user that the OS customization and boot up process can take an extended amount of time (e.g., more than 15 minutes). Display element 510 may present more or less explanatory text, such as a suggestion to the user to wait at least 10-15 minutes after launching an instance before trying to retrieve the auto-generated password.

Figure 6:
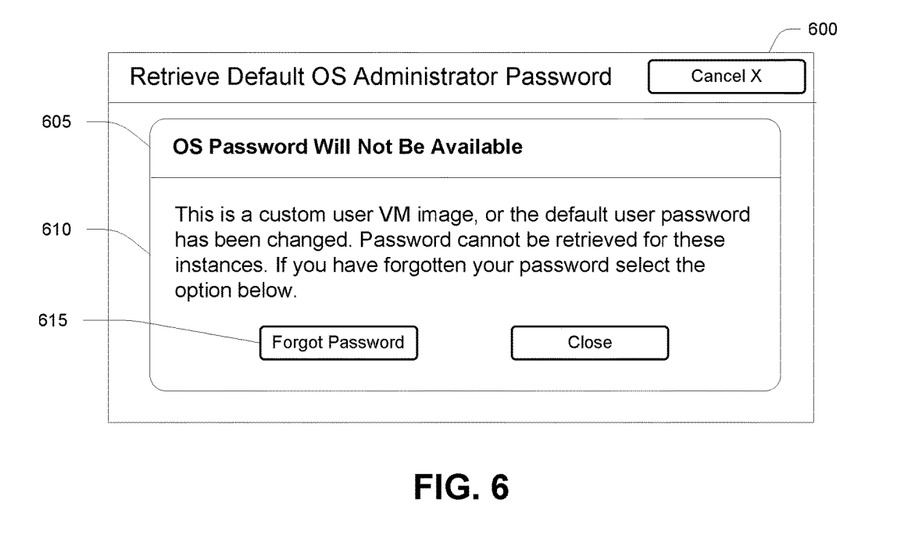

FIG. 6 illustrates an example user interface 600, in the form of a dialog box, which presents a user with a message indicating that a password will not be available. The example user interface 600 and/or the associated message may be generated and provided, for example, by the intermediary system of FIG. 7 during the process 1000 (e.g., at block 170).

The user interface 600 may include several display and user interactive elements, including display element 605, display element 610, and user control element 615. Additional user interaction controls may also be provided such as buttons and other controls usable to, for example, cancel or close the dialog box. At display element 605 the user interface 600 presents a heading associated with the provided message. As illustrated the heading indicates "OS Password Will Not Be Available," and additional explanatory text is provided at display element 610 to explain to the user that the OS password will not be available, for example, because the VM instance is a custom user VM image or because the default user password has been changed, and further that a password cannot be retrieved for such instances. Display element 610 may present more or less explanatory text, such as a suggestion to the user to try selecting a "Forgot Password" option to try to retrieve the password in an alternate way. The user interface 600 may also provide, for example via user control element 615, a button or other user-selectable control to enable the user to submit a "Forgot Password" request. Different explanatory text elaborating on why a password will not be available, as well as other options for addressing the issue, may also be presented. For example, user interface 600 may also present user-selectable controls, links, or other information on how to contact customer service for assistance, to submit a new request for a different VM instance, or other actions.

Examples of Intermediary Systems

Figure 7:
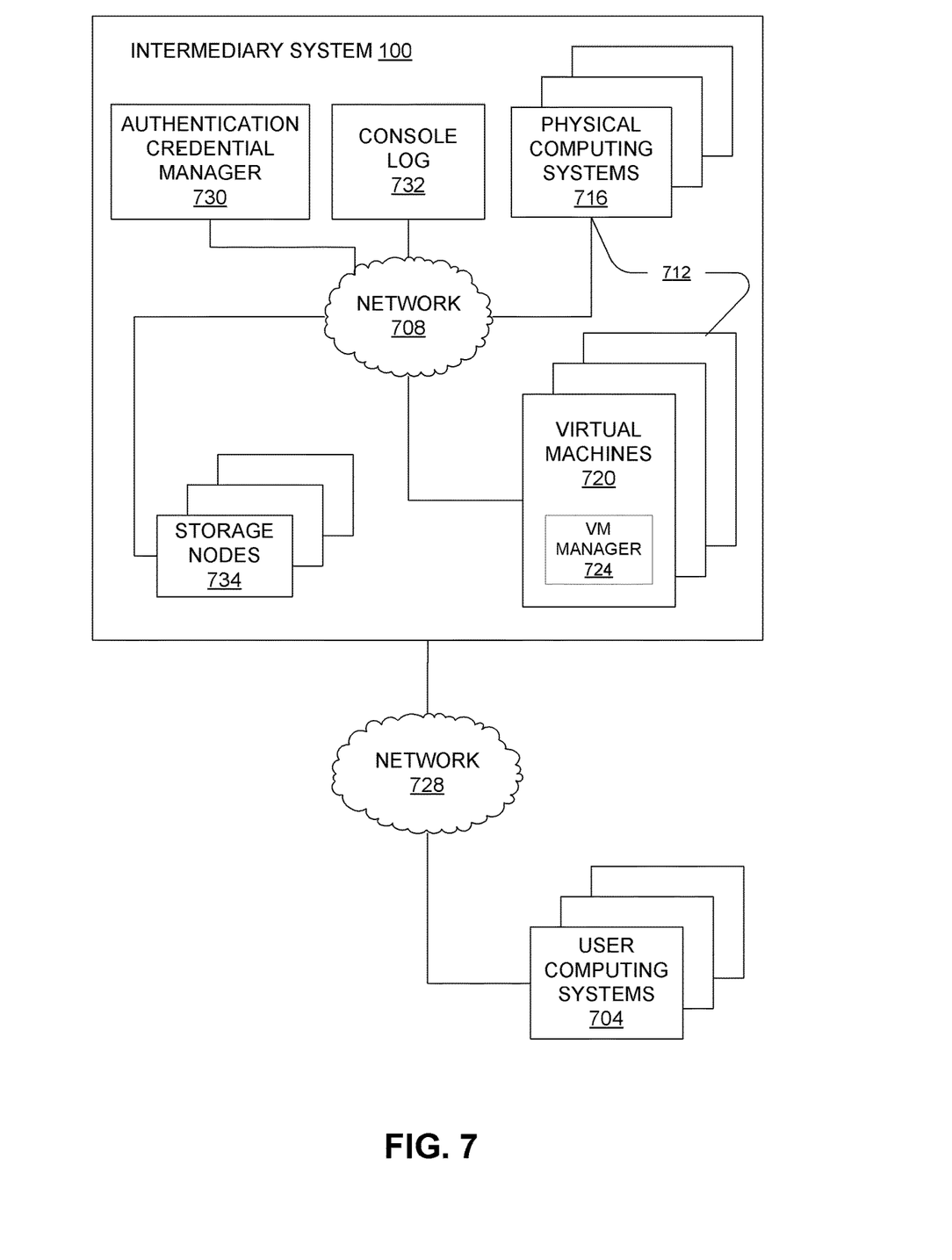
FIG. 7 is a block diagram illustrating a general architecture and environment involving an intermediary system according to one embodiment.

FIG. 7 is a general architecture and network diagram schematically illustrating an example of an intermediary system 100 that can provide password status detection and notification services for computing resources provided to multiple user computing systems 704 via a communication network 708. For example, the intermediary system 100 can manage requests from a user to launch virtual machine instances and request administrator passwords for VM instances, on behalf of the user. At least some of the user computing systems 704 may be remote from the intermediary system 100. In this example, users can use the computing systems 704 to access the intermediary system 100 over the communication network 708. The network 708 may, for example, be a publicly accessible network of linked networks, possibly operated by various distinct parties, such as the Internet. In other embodiments, the network 708 may be a private network, such as, for example, a corporate or university network that is wholly or partially inaccessible to non-privileged users. In still other embodiments, the network 708 may include one or more private networks with access to and/or from the Internet.

The intermediary system 100 provides a variety of functionality for managing execution of programs for multiple users. In the example illustrated in FIG. 7, the intermediary system 100 comprises a plurality of computing nodes 712 that can execute programs on behalf of the users. The computing nodes 712 may comprise one or more physical computing systems 716 and/or one or more virtual machines 720 that are hosted on one or more physical computing systems. For example, a host computing system may provide multiple virtual machines 720 and include a virtual machine ("VM") manager 724 to manage those virtual machines (e.g., a hypervisor or other virtual machine monitor).

In the example illustrated in FIG. 7, each of the computing nodes 712 has some amount of computing resources available for executing one or more programs. Each computing node 712 may be configured to provide a specific amount of program execution capacity, which may be measured, for example, by a combination of one or more of processing capacity (e.g., number and/or size of processing units), memory capacity, storage capacity, network bandwidth capacity, non-network communication bandwidth, etc. In some embodiments, the intermediary system 100 may provide preconfigured computing nodes 712, with each preconfigured computing node having similar and/or equivalent amounts of resources available for executing programs on behalf of users. In other embodiments, the intermediary system 100 may provide a selection of various different computing nodes 712 from which a user may choose for executing programs on behalf of the user. In some such embodiments, the computing nodes 712 may have varying amounts and/or types of computing resources (e.g., size, speed and/or type of processing units; number of processing units; amount of memory and/or storage; platform configuration, such as 32-bit or 64-bit, operating system, etc.).

The intermediary system 100 may provide user computing systems 704 with access to storage nodes 734 that provide mass storage of data, programs, and other user information. The storage nodes 734 may comprise any type of persistent data storage, for example non-volatile memory devices such as, e.g., hard disk drives, optical disk drives, etc. In the example illustrated in FIG. 7, the computing nodes 712 can access the storage nodes 734 via a network 728. The network 728 may include multiple networking devices (not shown) such as, e.g., switches, edge routers, core routers, etc. The network 728 may, but need not be, a different network than the network 708 shown in FIG. 7.

Users of the intermediary system 100 can interact with the intermediary system 100 via an authentication credential manager 730 to request passwords for the virtual machines 720. The authentication credential manager 730 can be connected to the computing nodes 712 and the storage nodes 734 via the network 728. The authentication credential manager 730 can provide one or more user interfaces, such as the user interfaces illustrated and described herein with reference to FIGS. 2, 3, 4A, 4B, 5 and 6, which may be provided or displayed in a console application (e.g., a website or an application) provided or made accessible to user computing systems 704. The authentication credential manager 730 can receive requests for authentication credentials such as passwords for the virtual machines 720 from the user computing systems 704 over the network 708. A user may request via the authentication credential manager 730 that the intermediary system 100 provide one or more computing nodes for execution of a program (or programs) on behalf of the user (or other users authorized by the user). In various embodiments, computing resources may be specified at the time of a request for execution of programs on behalf of a user and/or at one or more other times, such as when a user registers and/or subscribes to use services of the intermediary system 100. In some embodiments, the authentication credential manager 730 may provide subscription and/or registration services to one or more users, such that users may specify information related to one or more programs to execute on behalf of a user (e.g., programs, source code, addressable locations of one or more programs, etc.), account information (e.g., user name, billing information, etc.), terms of use, etc. In some embodiments, after a user interacts with the authentication credential manager 730 to subscribe and/or register for services, the user may be issued one or more request identifiers (e.g., keys, tokens, user names, passwords, etc.) that are associated with the user and are to be used in conjunction with executing programs on behalf of the user. In other embodiments, a module other than the authentication credential manager 730 may be provided to perform various operations related to subscription and/or registration services of the intermediary system 100.

In some embodiments, the authentication credential manager 730 is executed or embodied by one or more physical or virtual computing systems. For example, in some embodiments, a server computing system that has components including a CPU, I/O components, storage, and memory may be used to execute the authentication credential manager 730. The I/O components include a display, a network connection to the network 728, a computer-readable media drive, and other I/O devices (e.g., a keyboard, a mouse, speakers, etc.). An embodiment of the authentication credential manager 730 can be stored as one or more executable program modules in the memory of the server, and the authentication credential manager 730 can interact with computing nodes 712 (e.g., physical computing systems 716 and/or VMs 720) over the network 728. The authentication credential manager 730 can receive requests from users for computing resources of the intermediary system 100 via the network 708. Further, the intermediary system 100 may be built on top of existing virtual machine systems and/or environments and be designed to coordinate the actions of the existing systems.

The systems and methods described herein with reference to generation of an authentication credential may be applied to any operating system or OS which involves or requires use of an authentication credential to gain secure access to the OS and/or the virtual machine on which the OS is installed. Examples of operating system software to which the systems and methods disclosed herein may apply include but are not limited to, for example, iOS, Android, Chrome OS, Windows XP, Windows Vista, Windows 7, Windows 8, Windows Server, Windows CE, Unix, Linux, SunOS, Solaris, iOS, Blackberry OS, Mac OS X, proprietary operating systems, and/or other compatible operating systems.

Additional Embodiments

In other embodiments, the intermediary system 100 may be configured differently, include different components or modules, and/or omit some components or modules shown in FIG. 7. For example, in one embodiment, intermediary system 100 includes one or more hardware processors in communication with a computer readable medium storing software modules including instructions that are executable by the one or more hardware processors, and one or more software modules. The one or more software modules may instruct a computing system to execute the various methods, approaches, and/or techniques as described herein.

As described herein, the intermediary system 100 can be implemented by a computing system that includes one or more physical servers or other computing machines, such as several computing machines interconnected via a network. Thus, each of the components depicted in the intermediary system 100 can include hardware and/or software for performing various features. In one embodiment, the intermediary system 100 is implemented in association with a web site or collection of web sites.

The processing of the various components of the intermediary system 100 can be distributed across multiple machines, networks, and other computing resources. The various components of the intermediary system 100 can also be implemented in one or more virtual machines, rather than in dedicated servers. Likewise, the data repositories shown can represent physical and/or logical data storage, including, for example, storage area networks or other distributed storage systems. Moreover, in some embodiments the connections between the components shown represent possible paths of data flow, rather than actual connections between hardware. While some examples of possible connections are shown, any of the subset of the components shown can communicate with any other subset of components in various implementations.

In some embodiments, the intermediary system 100 may be configured differently than illustrated in the figures above. For example, various functionalities provided by the illustrated modules can be combined, rearranged, added, or deleted. In some embodiments, additional or different processors or modules may perform some or all of the functionalities described with reference to the example embodiment illustrated in the figures above. Many implementation variations are possible.

Other types of programmatic interactions (additionally or alternatively) between the intermediary system 100 and/or user computing systems 704 are possible in addition to those described above. For example, an intermediary system 100 submission or command may be received directly from a user (e.g., via an interactive console or other graphical user interface (GUI) provided by the intermediary system 100) or from an executing program on a user computing systems 704. In some embodiments, users may interact with the intermediary system 100 using other types of interfaces and in other ways. For example, the intermediary system 100 may provide a web services interface (e.g., a web page or set of web pages) that allows a user to submit a request using a web browser. Other types of interfaces, such as a command line interface, may also be used.

In some embodiments, the intermediary system 100 may be implemented on, or in communication with, one or more hosted computing environments. The hosted computing environments may include a collection of rapidly provisioned and released computing resources hosted in connection with the intermediary system 100. Such computing resources may be referred to, individually, as host computing devices. The computing resources may further include a number of computing, networking and storage devices in communication with one another. In some embodiments, the computing devices may correspond to physical computing devices. In other embodiments, the computing devices may correspond to virtual machine instances implemented by one or more physical computing devices. In still other embodiments, computing devices may correspond to both virtual computing devices and physical computing devices. A hosted computing environment may also be referred to as a cloud computing environment.

Each of the processes, methods, and algorithms described in the preceding sections may be embodied in, and fully or partially automated by, code modules executed by one or more computers, computer processors, or machines configured to execute computer instructions. The code modules may be stored on any type of non-transitory computer-readable medium or tangible computer storage device, such as hard drives, solid state memory, optical disc, and/or the like. The processes and algorithms may be implemented partially or wholly in application-specific circuitry. The results of the disclosed processes and process steps may be stored, persistently or otherwise, in any type of non-transitory computer storage such as, e.g., volatile or non-volatile storage.

CONCLUSION

Depending on the embodiment, certain acts, events, or functions of any of the processes or algorithms described herein can be performed in a different sequence, can be added, merged, or left out altogether (e.g., not all described operations or events are necessary for the practice of the algorithm). Moreover, in certain embodiments, operations or events can be performed concurrently, e.g., through multi-threaded processing, interrupt processing, or multiple processors or processor cores or on other parallel architectures, rather than sequentially.

Conditional language used herein, such as, among others, "can," "could," "might," "may," "e.g.," and the like, unless specifically stated otherwise, or otherwise understood within the context as used, is generally intended to convey that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without author input or prompting, whether these features, elements and/or steps are included or are to be performed in any particular embodiment. The terms "comprising," "including," "having," and the like are synonymous and are used inclusively, in an open-ended fashion, and do not exclude additional elements, features, acts, operations and so forth. Also, the term "or" is used in its inclusive sense (and not in its exclusive sense) so that when used, for example, to connect a list of elements, the term "or" means one, some, or all of the elements in the list.

Disjunctive language such as the phrase "at least one of X, Y, Z," unless specifically stated otherwise, is otherwise understood with the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

While the above detailed description has shown, described and pointed out novel features as applied to various embodiments, it can be understood that various omissions, substitutions and changes in the form and details of the devices or algorithms illustrated can be made without departing from the spirit of the disclosure. As can be recognized, certain embodiments of the inventions described herein can be embodied within a form that does not provide all of the features and benefits set forth herein, as some features can be used or practiced separately from others. The scope of certain inventions disclosed herein is indicated by the appended claims rather than by the foregoing description. All changes that come within the meaning and range of equivalency of the claims are to be embraced within their scope.

What is claimed is:

1. A computer system for providing an authentication credential status, the system comprising:
   one or more hardware processors configured to at least:
      receive, from a user computing system over a network, a request for an encrypted authentication credential associated with a virtual machine instance;
      determine that a cryptographic pair is associated with the virtual machine instance, wherein the cryptographic pair is configured to generate the encrypted authentication credential to provide secure access to the virtual machine instance;
      determine that an encrypted authentication credential based on the cryptographic pair has not been generated for the virtual machine instance;
      in response to determining that the encrypted authentication credential has not been generated, generate an authentication credential availability indicator based at least on whether the virtual machine instance is in a ready state; and
      transmit, over the network, the authentication credential availability indicator to the user computing system.

2. The computer system of claim 1, wherein the one or more hardware processors are further configured to determine that the virtual machine instance is in the ready state.

3. The computer system of claim 2, wherein the one or more hardware processors are further configured to cause an indication to be presented on the user computing system, the indication indicating that the encrypted authentication credential will not be available and including a selectable option for providing an indication that a user of the user computing system has forgotten a password associated with the user.

4. The computer system of claim 1, wherein the one or more hardware processors are further configured to:
   determine that the virtual machine instance is not in the ready state; and
   cause an indication to be presented on the user computing system, the indication indicating that the virtual machine instance has not yet finished its launch process and specifying a suggested amount of time after which a user of the user computing system should request the encrypted authentication credential again.

5. The computer system of claim 1, wherein the one or more hardware processors are further configured to determine that an encrypted authentication credential has not been generated for the virtual machine instance based at least on an entry in a console log, wherein the entry indicates that a password has not been generated for the virtual machine instance.

6. The computer system of claim 1, wherein the one or more hardware processors are further configured to cause the authentication credential availability indicator to be presented via a user interface provided on the user computing system.

7. The computer system of claim 6, wherein the one or more hardware processors are further configured to receive, via the user interface, a request indicating that a user of the user computing system has forgotten a password associated with the user.

8. The computer system of claim 1, wherein the encrypted authentication credential comprises a password encrypted using the cryptographic pair.

9. The computer system of claim 1, wherein the encrypted authentication credential comprises an identity of the virtual machine instance.

10. A computer-implemented method for providing an authentication credential status, the computer-implemented method comprising:

by a computer system comprising computer hardware and memory,
determining that a cryptographic pair has been associated with a virtual machine instance, wherein the cryptographic pair is configured to generate an encrypted authentication credential to provide secure access to the virtual machine instance;
determining that an encrypted authentication credential based on the cryptographic pair has not been generated for the virtual machine instance;
in response to determining that the encrypted authentication credential has not been generated, generating an authentication credential availability indicator based at least on whether the virtual machine instance is in a ready state; and
transmitting the authentication credential availability indicator to a user computing system that is in network communication with the computer system.

11. The computer-implemented method of claim 10, further comprising determining that the virtual machine instance is in the ready state.

12. The computer-implemented method of claim 11, further comprising generating the authentication credential availability indicator indicating that the encrypted authentication credential will not be available.

13. The computer-implemented method of claim 10, further comprising:
determining that the virtual machine instance is not in the ready state; and
generating the authentication credential availability indicator indicating that the virtual machine instance has not yet finished its launch process.

14. The computer-implemented method of claim 10, wherein the cryptographic pair is a key pair including a public key and a private key.

15. The computer-implemented method of claim 14, wherein the encrypted authentication credential includes an encrypted password generated using the public key, the public key associated with a user associated with the user computing system.

16. Non-transitory computer storage storing instructions that, when executed by one or more processors, cause the one or more processors to at least:
determine that a cryptographic pair has been associated with a virtual machine instance, wherein the cryptographic pair is configured to generate an encrypted authentication credential to provide secure access to the virtual machine instance;
determine that an encrypted authentication credential based on the cryptographic pair has not been generated for the virtual machine instance;
in response to determining that the encrypted authentication credential has not been generated, generate an authentication credential availability indicator based at least on whether the virtual machine instance is in a ready state; and
transmit the authentication credential availability indicator to a user computing system that is in network communication with the computer system.

17. The non-transitory computer storage of claim 16, wherein the instructions further cause the one or more processors to determine that the virtual machine instance is in the ready state.

18. The non-transitory computer storage of claim 17, wherein the instructions further cause the one or more processors to generate the authentication credential availability indicator indicating that the requested encrypted authentication credential will not be available.

19. The non-transitory computer storage of claim 16, wherein the instructions further cause the one or more hardware processors to:
determine that the virtual machine instance is not in the ready state; and
generate the authentication credential availability indicator indicating that the virtual machine instance has not yet finished its launch process.

20. The non-transitory computer storage of claim 16, wherein the encrypted authentication credential comprises an administrator password for an operating system running on the virtual machine instance.

* * * * *